United States Patent
Anderson et al.

(10) Patent No.: US 8,212,880 B2
(45) Date of Patent: Jul. 3, 2012

(54) THREE-AXIS IMAGE STABILIZATION SYSTEM

(75) Inventors: Scott A. Anderson, Logan, UT (US); Morgan Davidson, River Heights, UT (US); Jason Lee Wooden, Mendon, UT (US); R. Camden Robinson, Lindon, UT (US); James Peterson, North Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 602 days.

(21) Appl. No.: 12/339,444

(22) Filed: Dec. 19, 2008

(65) Prior Publication Data

US 2009/0160951 A1    Jun. 25, 2009

Related U.S. Application Data

(60) Provisional application No. 61/015,631, filed on Dec. 20, 2007.

(51) Int. Cl.
*H04N 5/228* (2006.01)

(52) U.S. Cl. .................................................. 348/208.7

(58) Field of Classification Search ............. 348/208.99, 348/208.7
See application file for complete search history.

(56) References Cited

U.S. PATENT DOCUMENTS

| | | | |
|---|---|---|---|
| 5,596,365 A | 1/1997 | Erickson | |
| 5,654,549 A * | 8/1997 | Landecker et al. | 250/332 |
| 6,220,095 B1 * | 4/2001 | Fennel et al. | 73/514.08 |
| 6,384,976 B1 | 5/2002 | Ishijima et al. | |
| 6,992,700 B1 * | 1/2006 | Sato et al. | 348/208.2 |
| 7,388,604 B2 | 6/2008 | Azusawa et al. | |
| 7,548,685 B2 * | 6/2009 | Mashima et al. | 396/53 |
| 7,773,116 B1 * | 8/2010 | Stevens | 348/208.4 |
| 7,893,965 B2 * | 2/2011 | Heim et al. | 348/208.99 |
| 2006/0061660 A1 * | 3/2006 | Brackmann | 348/208.1 |
| 2006/0245746 A1 | 11/2006 | Makii | |
| 2007/0050139 A1 | 3/2007 | Sidman | |
| 2009/0002825 A1 * | 1/2009 | Morita et al. | 359/554 |
| 2009/0219402 A1 * | 9/2009 | Schneider | 348/208.7 |

* cited by examiner

*Primary Examiner* — Timothy J Henn (57) ABSTRACT

An image stabilization system includes an optical assembly configured to receive electromagnetic radiation emitted by a target and produce focused image of the target; a focal plane array, the focal plane array being configured to receive the image and integrate at least a portion of the electromagnetic radiation making up the image to produce an electrical representation of the image; sensors configured to provide kinematic data; a control system receiving the kinematic data and estimating jitter-induced motion of the image on the focal plane and outputting a control signal; and actuators configured to receive the control signal and to translate the focal plane along two orthogonal axes and rotate the focal plane about a third orthogonal axis such that jitter-induced motion of the image on the focal plane is reduced.

18 Claims, 8 Drawing Sheets

THREE-AXIS IMAGE STABILIZATION SYSTEM

RELATED DOCUMENTS

The present application claims the benefit under 35 U.S.C. §119(e) of U.S. Provisional Application No. 61/015,631, filed Dec. 20, 2007, which is herein incorporated by reference in its entirety.

RIGHTS OF U.S. GOVERNMENT

The U.S. Government has a paid-up license in this invention and the right in limited circumstances to require the patent owner to license others on reasonable terms as provided for by the terms of Contract No. N00173-D-02-2003 awarded by the Naval Research Laboratory.

BACKGROUND

Dynamic imaging systems, mounted on a moving platform, tracking a moving target object, or both, include an aiming structure such as a gimbal assembly and controls to point a camera system independently from the platform (e.g. aircraft, satellite, vehicle, etc.) on which it is mounted. Meanwhile, the camera system itself may include optics of various types as well as a plane for receiving an image. The plane of the image may be a focal plane array (FPA), film, or the like.

One problem of concern to scientists in atmospheric research, as well as those involved with imaging from aircraft or spacecraft, is the influence of jitter in destroying the alignment of a focal plane, such as that for film or a sensor array. The misalignment may be from any source, resulting in rotation of the focal plane structures with respect to a mount, optics, or an object being imaged through those optics. Thus, it would be an advance in the art to find a means to stabilize a focal plane array with respect to an image viewed, thus removing a significant amount of the disparity between the jitter motion of the focal plane array with respect to the optics, imaged object, etc.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In view of the foregoing, an apparatus and method in accordance with the invention provide piezoelectric drivers operating at frequencies associated therewith to drive movement of a focal plane array about the effective center of its optical system.

Electro-optical imaging relies on a focal plane, such as a focal plane array (FPA) of sensors receiving photons (i.e., light, electromagnetic radiation), typically integrated over a period of time. The incoming radiation is detected by the sensors to cause a particular intensity of the resulting signal. While integrating light, an imaging system or imager (e.g., focal plane array, camera plane, etc.) appears to smear or spread the incoming light over a larger area thereof than should accurately represent the object being imaged in the presence of vibration in the imaging system.

Smearing degrades image quality. In a sense, smearing represents lost information. More accurately, perhaps, smearing represents misplaced information that has been distributed over an area larger than it should have been, thus distorting the image and providing misinformation. Nevertheless, the result of smearing ends up typically obscuring the desirable information of an image.

Vibrating equipment is a simple reality. It is the normal result of the complex interactions between pieces of hardware connected in any configuration having a moving part. A system subject to vibration may be subject to numerous modes, frequencies, amplitudes, and other characterizations of vibration. Any particular part, item, or system may move with respect to, or because of an interaction with any other particular part connected thereto. This is typically true regardless of how securely fastened a part is to another. Vibration isolation may be greater or lesser between different parts in an assembly, and the range of transmission may vary widely. The more or less tractable the analysis problem of determining vibrational modes and frequencies and compensating for them passively, the more likely will be the need for some type of active isolation or correction.

Vibration, or relative motion of a focal plane array with respect to its optics, or simply with respect to its target is called jitter. Jitter may be characterized as motion at a sufficiently high frequency and amplitude to cause smearing within about an order of magnitude of a picture element (pixel) of a focal plane array. Thus, more than about one tenth of a pixel of distance in smearing of an image is often unacceptable. A smearing distance of less than about one tenth of a pixel is usually satisfactory for many applications of a dynamic camera relying on a focal plane array.

Various systems exist to control pointing and tracking of cameras and other imaging devices. However, in certain scientific applications, the pointing and stabilization of a platform containing a camera on a gimbaled mount is insufficient.

For example, the dynamics of a spacecraft, rocket motor, camera, various other equipment, and the like may introduce vibrations at various frequencies and amplitudes. A complete analysis of all possible vibrational frequency sources and resonances consequent thereto is often virtually impossible. Correction of such vibrations, if known, may not be tractable. Thus, it is not uncommon for a certain amount of "jitter" to exist in some aspect of a camera or other imaging system.

For example, a focal plane array may be thought of as a destination of rays of electromagnetic radiation (e.g., light) leveraged across a fulcrum represented by optical elements, the mounting system, or the like, while the opposite of the end of that lever represented by the ray is the imaged object, acting as the source or reflector of "light" (e.g. some spectrum of radiation) to be detected by the focal plane array. Accordingly, a comparatively small amount of rotation of a focal plane array in any dimension (e.g., about any axis) represents a comparatively much larger displacement of the opposite end of that ray rotated about the fulcrum, at the object or "viewed object" end of the ray.

Consequently, the comparative distance between the focal plane and its related optics, compared to the relative distance between those same objects and an object viewed, presents a tremendous multiplier or leverage. Accordingly, in a typical system where, for example, a meter of area in a scanned object or region may be represented by the light transmitted to a single pixel of a focal plane array, will be distorted if that focal plane array is allowed to distort or smear by a significant fraction of the size of a pixel.

In one example, a rotation of a focal plane array resulting in one pixel of displacement of the location of reception of a ray in the focal plane array during an integration period, where that ray represents, for example, one square meter of a target, can completely smear that square meter of target in the resulting image. Accordingly, it is desirable to maintain stability of a focal plane array within a distance of approximately one order of magnitude less than the size of a pixel.

For example, 10 percent of a pixel width variation or jitter may be acceptable, still rendering a substantially clear image. By contrast, jitter on the order of the size of a pixel, which is very likely in a nonstabilized system, will often render an image much less clear or maybe unusable.

Accordingly, what is needed is a method for very high frequency stabilization of a focal plane array through small displacements. What is also needed is a mechanism for stabilizing such a focal plane array in accordance with its rate of rotation about three axes, in order to compensate about those three axes for such rotation due to jitter.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
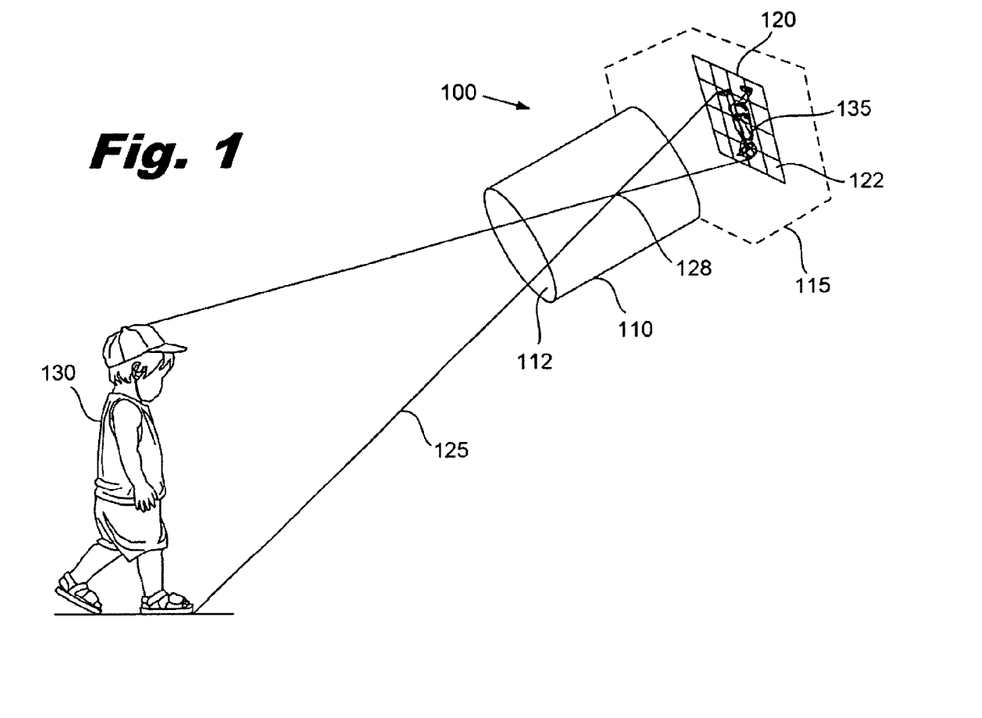
FIG. 1 is a diagram of an illustrative imaging system, according to one embodiment of principles described herein.

FIG. 1 is a diagram of an illustrative imaging system (100) which includes a camera body (115) which contains a focal plane (120). A lens (110) contains optics which focus light from an exterior scene (130) onto the focal plane (120). In this example, the lens (110) accepts light rays (125) through an aperture (112) and focuses the light rays (125) onto the focal plane (120) to produce an image (135) which is sensed by the focal plane (120).

The focal plane (120) is made up of a number of pixels (122). Each pixel (122) senses the portion of the image which is focused on it and produces an electrical signal which is proportional to that portion of the image. The number of pixels (122) in the illustrated focal plane (120) has been greatly reduced for clarity of illustration. Modern electronic camera systems typically include a focal plane made up of millions of pixels which provide the imaging resolution required to sense fine details in the exterior scene (130). However, the pixels (122) require a brief "integration time" during which each pixel (122) accumulates electrical charges proportional to the intensity of incident light. This "integration time" is analogous to the exposure time in a film camera. The optimal integration time for an imaging system (100) varies according to a number of factors, including the brightness of the exterior scene (130), the wavelength of light sensed by the focal plane (120), the light gathering capabilities of the lens system (110), and other factors. Ideally, the integration time is long enough for the pixels (122) to convert the incident optical energy into a significant electrical charge, but not so long that the individual pixels (122) become saturated.

Significant motion of the scene, objects within the scene, or imaging system during the integration time results in motion of the image (135) on the focal plane (120). This motion can move light which was previously incident on a pixel to neighboring pixels (122). This produces undesirable "smearing" in the image recorded by the focal plane (120). Smearing of the image results in a loss of image quality and information. Particularly when fine details in the image are important, such as aerial photography, smearing can unacceptably degrade the image quality.

Some motions of the imaging system produce less smearing of the optical image than others. For example, pure translation of the camera system with respect to the scene typically results in low amounts of smear because absolute translation of the focal plane array would be insignificant with respect to an image some kilometers distant. For example, one millimeter of displacement in pure translation is simply one millimeter of displacement with respect to a target.

However, even small rotations of the imaging system can produce significant amounts of smear. For example one millimeter of motion of the focal plane array (120) with respect to an optical fulcrum (128) represents, typically several centimeters, maybe even several meters of apparent displacement for rays of electromagnetic energy arriving from a targeted object.

Figure 2:
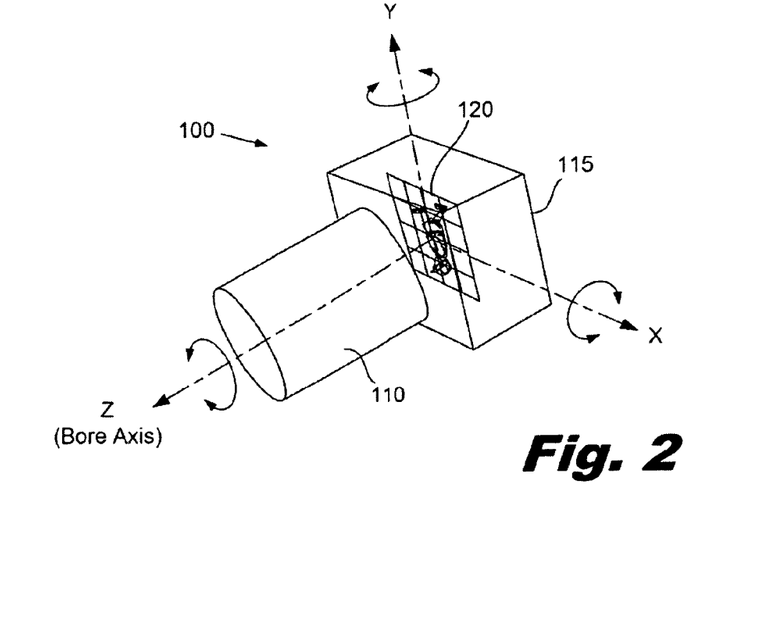
FIG. 2 is a diagram of rotational axes within an illustrative imaging system, according to one embodiment of principles described herein.

FIG. 2 is a diagram which illustrates rotation of an imaging system (100) about three orthogonal axes X, Y, Z. As discussed above, the optical rays (125, FIG. 1) passing through the lens (110) and striking the focal plane (120) can be thought of as a lever with a fulcrum (128) which is relatively close to the focal plane (120). Consequently, a small motion of the focal plane (120) about the fulcrum (128) can produce a large shift in the scene (130).

Rotation of the imaging system (100) about the X and Y axes results in a translation of the image (135, FIG. 1) across the two dimensional focal plane (120). For example, for a scene at a range of 1500 meters, a rotation of a given camera about the X or Y axis of a single milliradian could result in a movement of the field of view by over a meter. Rotation of the imaging system about the Z axis results in a corresponding rotation of the scene on the focal plane. The Z axis, or bore axis, is typically defined as a line which passes through the center of the optics and strikes the center of the focal plane (120). The amount of smearing produced from bore axis rotation can be dependent on a number of factors, including the current field of view of the camera. For example, the edges of a wide angle field of view produced by a fish eye lens would be relativity sensitive to bore axis rotations, while a narrower field of view may be less sensitive.

The human hand typically generates jitter that ranges from 0 to 20 Hz. Consequently, for handheld camera that image within the visible spectrum, controlling frequencies between 10 Hz and 20 Hz can significantly decrease the amount of jitter-induced smear. For applications where a camera is attached to a moving vehicle, such as a boat, truck or airplane, higher frequency vibrations can be much more prevalent. For example, vibration levels from 10 Hz to 500 Hz can be significant depending on the camera, optics, and focal plane.

Figure 3A:
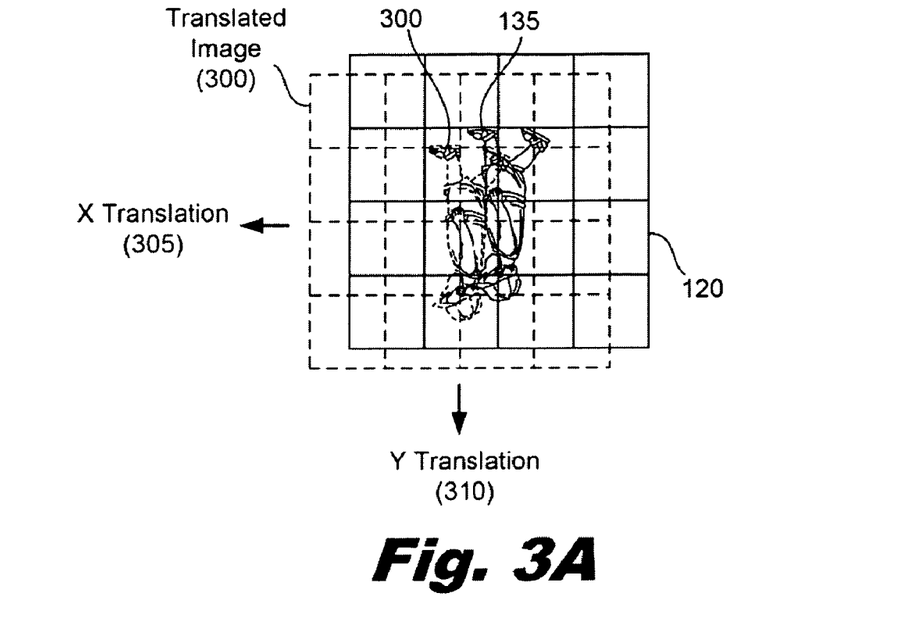
FIGS. 3A and 3B are diagrams showing the motion of an image on a focal plane during an integration period, according to one embodiment of principles described herein.
Figure 3B:
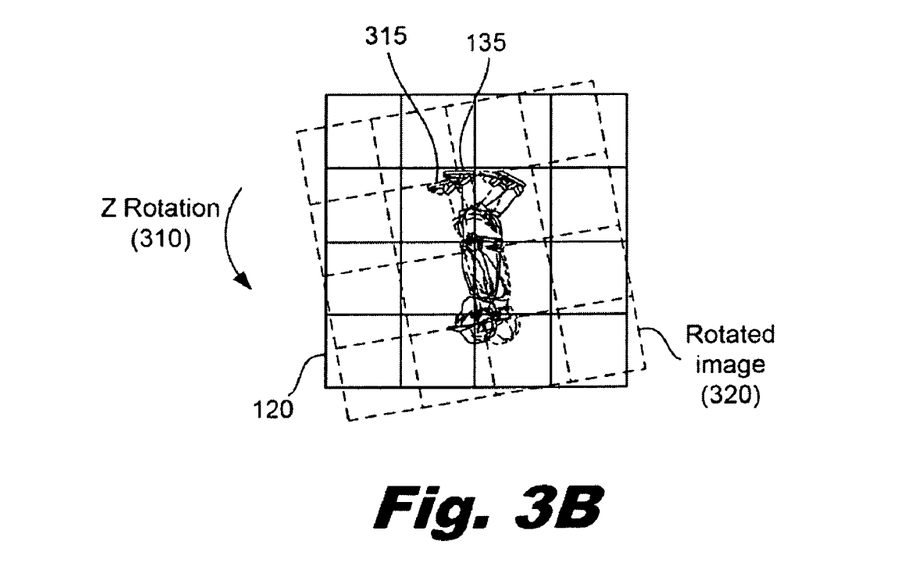

FIGS. 3A and 3B illustrate smearing of an image (135) on a focal plane (120) which may result from rotations of the imaging system during an integration period. FIG. 3A shows the translation of the image (135) on the focal plane (120) that results from rotations about the X and Y axes. Specifically, the X translation (305) is produced by rotations of imaging system (100) about the Y axis and the Y translation (310) is produced by rotations of imaging system (100) about the X axis. As a result of these rotations, the image moves across the focal plane during the integration period to a second location (300). This produces image smear and a corresponding loss of optical quality and information.

FIG. 3B illustrates the effects of rotations of the imaging system about the Z axis, which produces a corresponding rotation of the image (135) on the focal plane. As can be seen from the illustration, the displacement of the image (315) on the focal plane is greater on the perimeter of the image than in center of the image. Consequently, imaging systems with larger fields of view can be more sensitive to Z axis rotation than systems with narrower fields of view.

Figure 4:
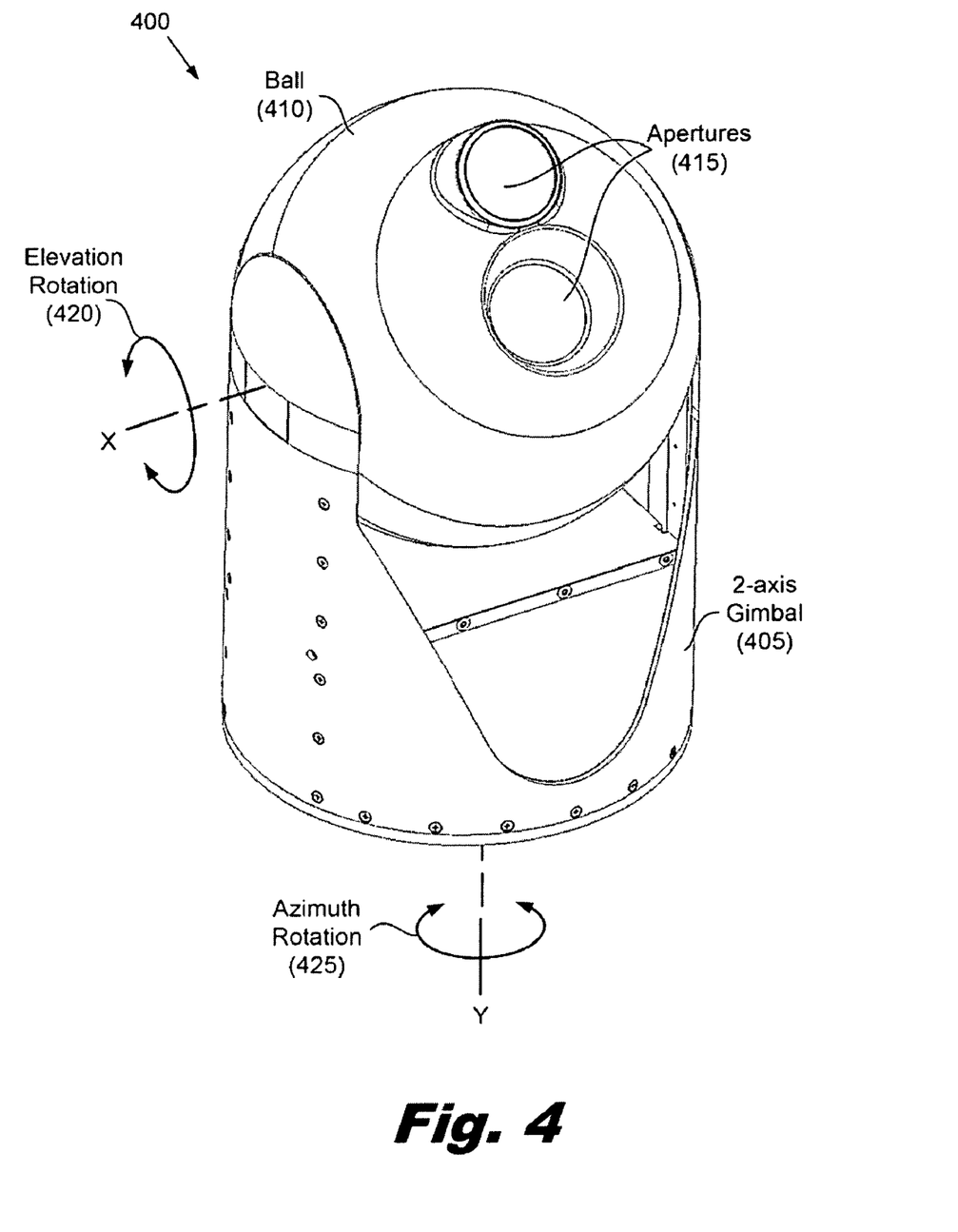
FIG. 4 is a perspective view of an illustrative two axis gimbaled imaging system, according to one embodiment of principles described herein.

As discussed above, dynamic imaging systems, such as imaging systems on an aircraft, can produce large amounts of relative motion between the imaging system and the target scene. A gimbaled system can be used to point the camera at the target scene and to compensate for relatively slow motions of the aircraft or other platform. FIG. 4 is a perspective view of an illustrative two axis gimbaled imaging system (400). The gimbaled imaging system (400) uses a two axis gimbal (405) to support and point a ball (410) which contains the lens and focal plane. Typical gimbaled systems provide an elevation rotation (420) about an X axis and an azimuth rotation (425) about a Y axis. By actuating motors which control motion about these two axes, the ball (410) can be oriented so that imaging systems looking out from one or more apertures (415) can be pointed in any direction within the range of motion provided by the gimbal. Consequently, the two axis gimbal can point the imaging system at a target or move across a scene independently from the motion of the mobile platform. The gimbaled imaging system (400) is a relatively massive device and consequently can typically only compensate for slower motions (such as motions below about 10 Hz). Further, the gimbaled imaging system (400) has extremely limited ability to compensate for rotations about the bore axis. Undesirable bore axis rotations can frequently occur in aircraft optical sensors as the result of pitch, roll, and heading perturbations in the aircraft motion.

As discussed above, higher frequency motions of the platform can also be produced by a mobile platform or the surrounding environment. For example, on an aircraft mounted optical system, vibrations produced by mechanical motion and turbulence can produce undesirable jitter and corresponding smear of the images. The gimbal (405) is unable to compensate for this higher frequency motion or rotations about the bore sight of the optical sensor. Consequently, to reliably produce high quality imagery, an image stabilization system may be incorporated within the optical system.

Figure 5:
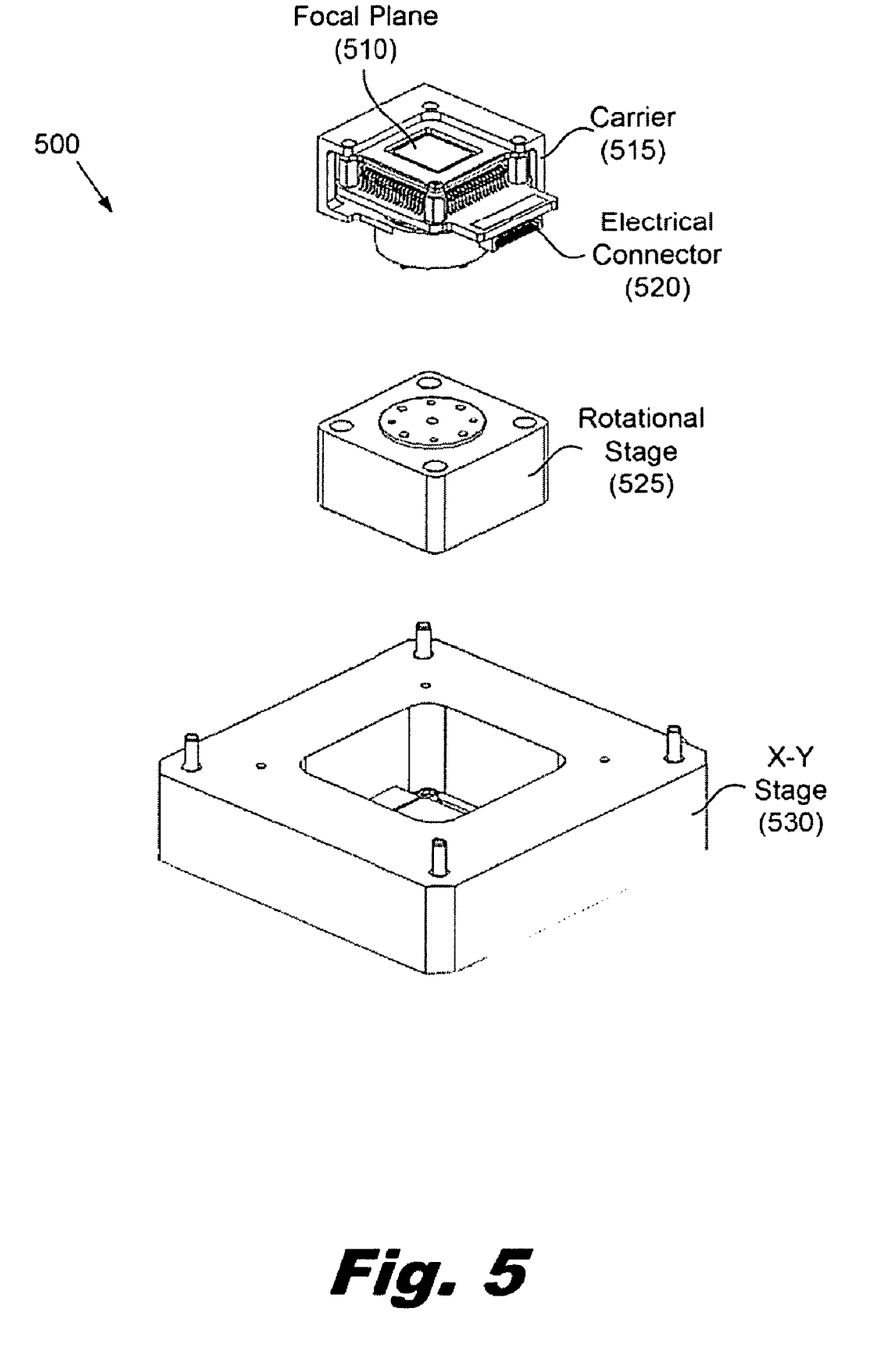
FIG. 5 is a perspective view of an illustrative three axis image stabilization system, according to one embodiment of principles described herein.

FIG. 5 is an exploded perspective view of an illustrative three axes image stabilization system (500). The three axes image stabilization system (500) includes an X-Y stage (530) and a rotational stage (525) which is nested into the interior of the X-Y stage (530). The focal plane (510) is contained within a carrier (515). The carrier (515) which is attached to the upper surface of the rotational stage (525). An electrical connector (520) allows the electrical signals produced by the individual pixels which make up the focal plane to be read. These stages (525, 530) move the focal plane to compensate for higher frequency jitter.

According to one illustrative example, the rotation stage (525) and X-Y stage (530) may be actuated by piezo electric actuators. Piezo electric actuators apply a voltage to a piezo active material which expands or contracts a distance which corresponds to the applied voltage. Typically this expansion or contraction is less than 1% of the overall size of the piezo active element. This change in the geometry of the piezo active material is extremely rapid and can produce a large amount of force.

In one embodiment, the piezo stages may be formed from a single monolith piece of metal which has been machined to form flexural joints which are moved by the piezoelectric actuators. This approach results in an extremely rigid stage which prevents the undesirable motion of the focal plane and allows for high frequency control of the focal plane position. For example, in the configuration illustrated in FIG. 5, the piezo stages (525, 530) may exhibit natural frequencies between approximately 300 to 500 Hz. Less rigid optical stages can be undesirable because they may allow the focal plane to move out of focus. Further, rigid stages are desirable because the data generated by angular rate sensors located in a separate location can be used to directly determine the motion of the focal plane to an acceptable level of accuracy.

According to one illustrative embodiment, the X-Y stage (530) can produce motions on the order of 100 microns and the rotational stage can produce motion on the order of 10 milliradians. Although this range of motion is relatively small, the stages produce enough travel to effectively cancel undesirable jitter-induced smearing. Integration times for many optical systems are typically on the order of milliseconds. Consequently, the magnitude of jitter-induced image translation on the focal plane during the integration period can be relatively small, typically on the order of 1 to 100 microns. The magnitude of the image translation can be a function of a number of parameters including the optical configuration of the system.

Each axis of the stages (525, 530) may also include a sensor which provides information about the current position of the stage. For example, various capacitive, inductive, optical or strain gage based sensors may be incorporated into the piezo stage to provide the desired feedback regarding the stage's current position.

Figure 6:
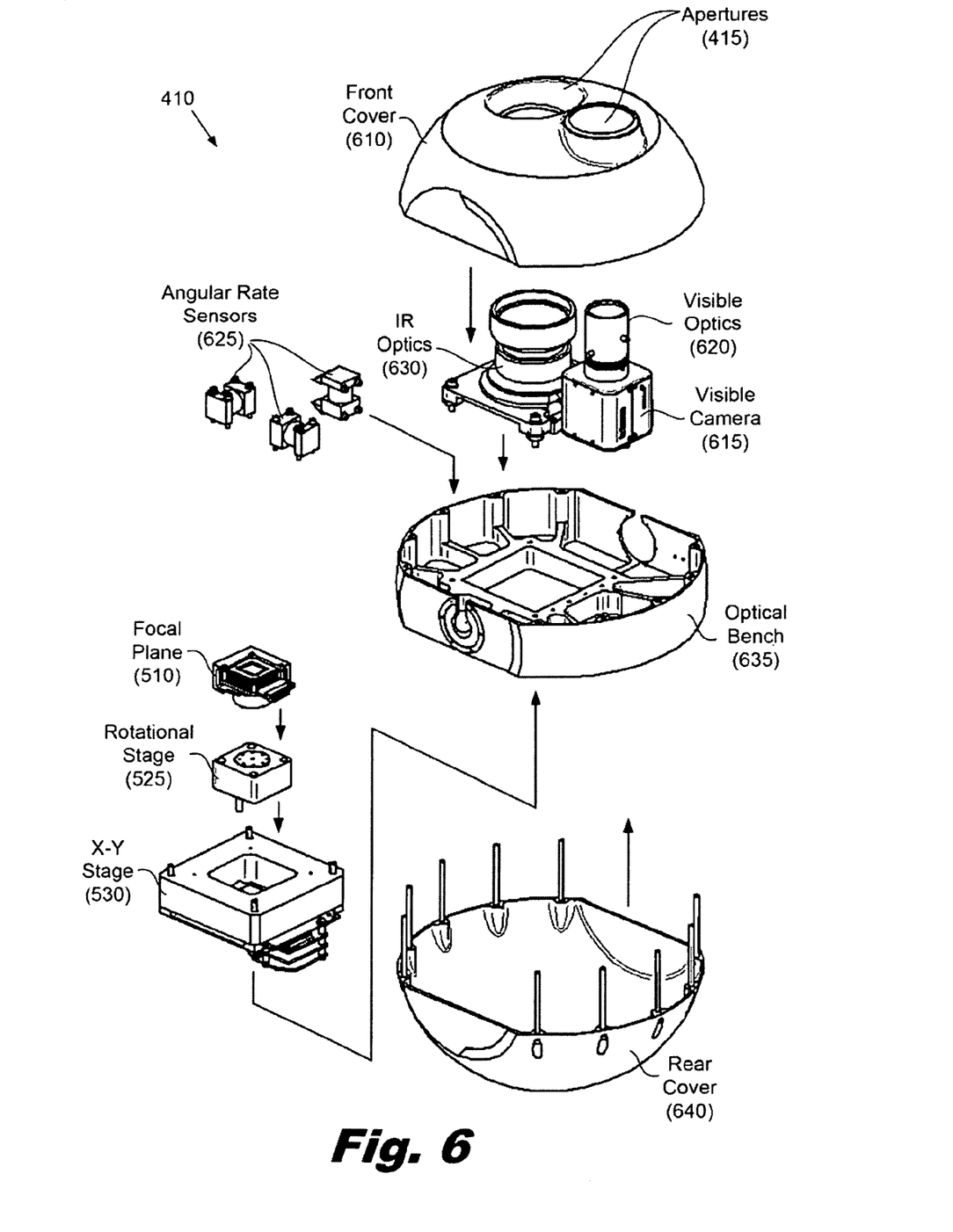
FIG. 6 is an exploded perspective view of an illustrative three axis image stabilization system incorporated into a two axis gimbaled imaging system, according to one embodiment of principles described herein.

FIG. 6 is an exploded perspective view of the three axis image stabilization system incorporated into the ball (410) of a two axis gimbaled imaging system (400, FIG. 4). According to one illustrative embodiment, an optical bench (635) provides a rigid and stable platform to which the other components are mounted. The X-Y stage (530) is mounted to the under side of the optical bench, with the rotational stage (525) mounted within the central cavity of the X-Y stage (530). The focal plane (510) is mounted to the upper surface of the rotational stage (525). According to one illustrative embodiment, the focal plane (510) may be an infrared (IR) detector which senses optical wavelengths in the infrared portion of the electromagnetic spectrum. Infrared focal planes can provide a number of benefits including night vision, high visibility of heat sources, detection of chemicals, and other advantages. However, infrared focal planes typically have longer integration times and are consequently more susceptible to jitter-induced smearing.

IR optics (630) are attached to the optical bench over the focal plane (510) such that optical energy from the exterior scene is focused onto the focal plane (510). According to one illustrative embodiment, an independent visible camera (615) with its associated visible optics (620) may also be included in the ball (410).

Three angular rate sensors (625) are attached to the optical bench (635) in three different orientations. According to one illustrative embodiment, these angular rate sensors (625) detect rotations about three orthogonal axes. According to one illustrative embodiment, the angular rate sensors may be mechanical gyroscopes, ring laser gyroscopes, magnetohydrodynamic rate sensors, micro-electro-mechanical-systems (MEMS) gyroscopes or the like. The angular rate sensors (625) may be selected according to various parameters, such as values for bandwidth, accuracy, drift, and the like. The signals generated by the angular rate sensors (625) are utilized by the image stabilization control system to determine how to move the focal plane.

Additionally or alternatively, other methods of measuring jitter may be used. In some embodiments, a sensor array may be utilized to detect either the absolute angle or the angular rate or both. These measurements may be made from a variety of locations, including at the optics (620, 630), at the gimbal (405), or at a focal plane (510) itself. For example, the imagery generated by the visible camera (615) may be utilized to sense angular rotations of the optical assembly. The visible camera (615) may have a much higher frame rate than the IR camera. By using a real time change detection algorithm or other suitable method, changes between frames in the visible data could be used to detect jitter. This illustrative method of sensing jitter could be used to supplement the angular rate sensors (625) or could be used independently.

A front cover (610) and a rear cover (640) attach to the optical bench (635) to protect the optical components and form the outer shell of the ball (410). The front cover (610) has two apertures (415) through which the IR and visible sensors (515, 615) receive optical energy from the surrounding scene. These apertures (415) may be covered by windows to protect the interior components. According to one illustrative embodiment, the front cover (610) and rear cover (640) may form hermetical seals with the optical bench (635) to provide a controlled environment within the ball (410).

Figure 7:
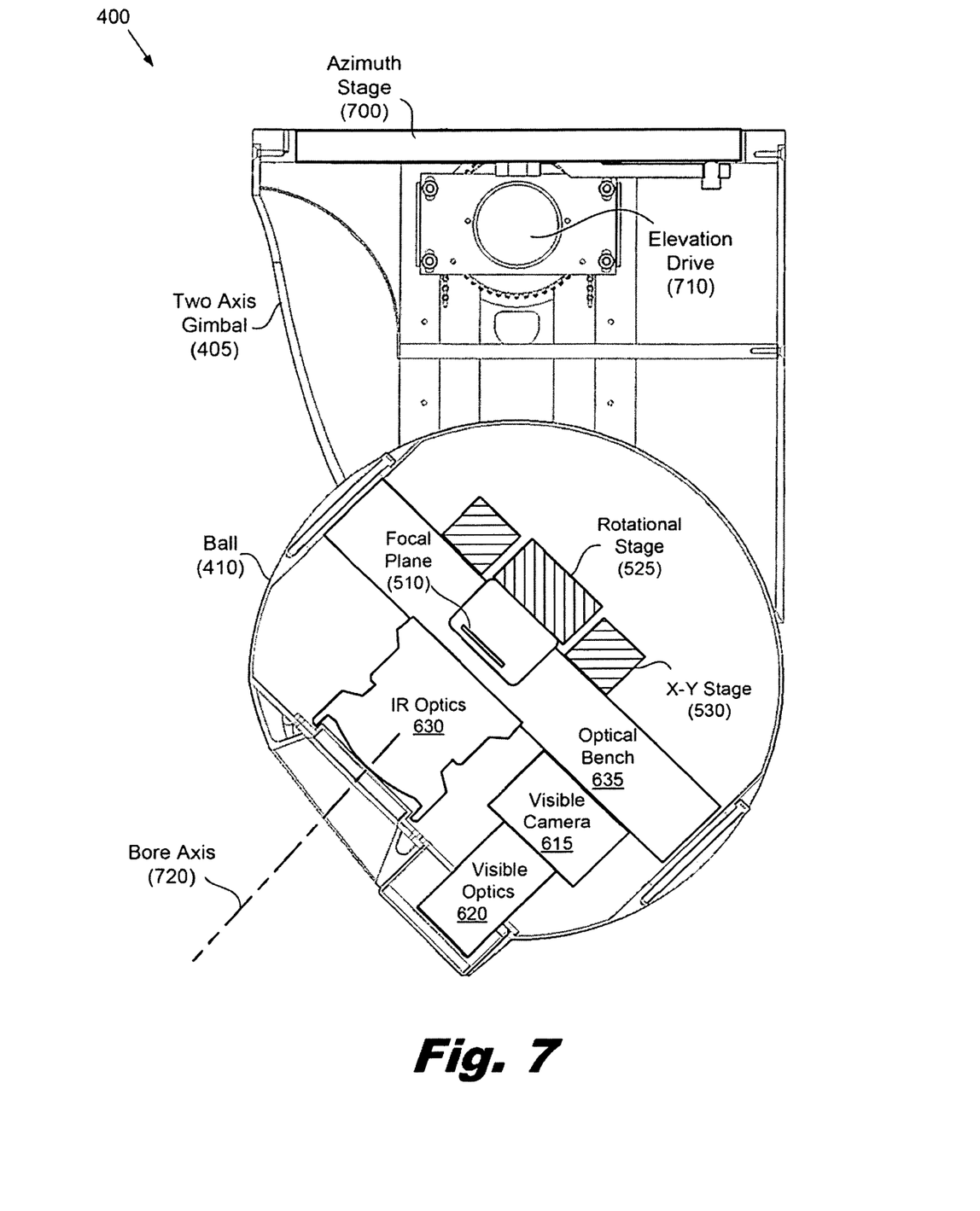
FIG. 7 is a cross-sectional diagram of an illustrative three axis image stabilization system incorporated into a two axis gimbaled imaging system, according to one embodiment of principles described herein.

FIG. 7 is a cross-sectional diagram of the illustrative image stabilization system incorporated into the gimbaled imaging system (400). The resulting system (400) has five controlled degrees of freedom: two coarse rotational degrees of freedom provided by the two axis gimbal (405) and finer three degrees of freedom provided by the image stabilization system (500, FIG. 5). As discussed above, the azimuth stage (700) and the elevation drive (710) of the gimbal (405) provide pointing and lower frequency corrections. The elevation drive (710) is connected to a pivot point in the gimbal arms and rotates the ball (410) about its center.

For higher frequency image stabilization, the three axis image stabilization system (500, FIG. 5) actuates the X-Y stage (530) and the rotation stage (525) to cancel out undesirable motion of the image across the focal plane (510). The piezoelectric actuators may be activated to move the focal plane array (410) about the X, Y, and Z axes at a rate, displacement, or both, equal and opposite to those imposed by vibration or jitter. As discussed above, the optical bench (625) provides a common reference point and stable platform for the various components which make up the ball (410). The X-Y stage (530) controls motion parallel to the plane of the focal plane (510) and the rotation stage (525) provides rotation about a bore axis (720) which passes through the center of the IR optics (630).

When the control system determines that a rotation of the optical system has occurred during an integration period, the appropriate control signals are sent to the X-Y stage (530) and the rotation stage (525). Actuation of the X-Y stage (530) translates both the attached rotational stage (525) and the focal plane (510). Rotations of the rotational stage (525) move only the attached focal plane (510).

Figure 8:
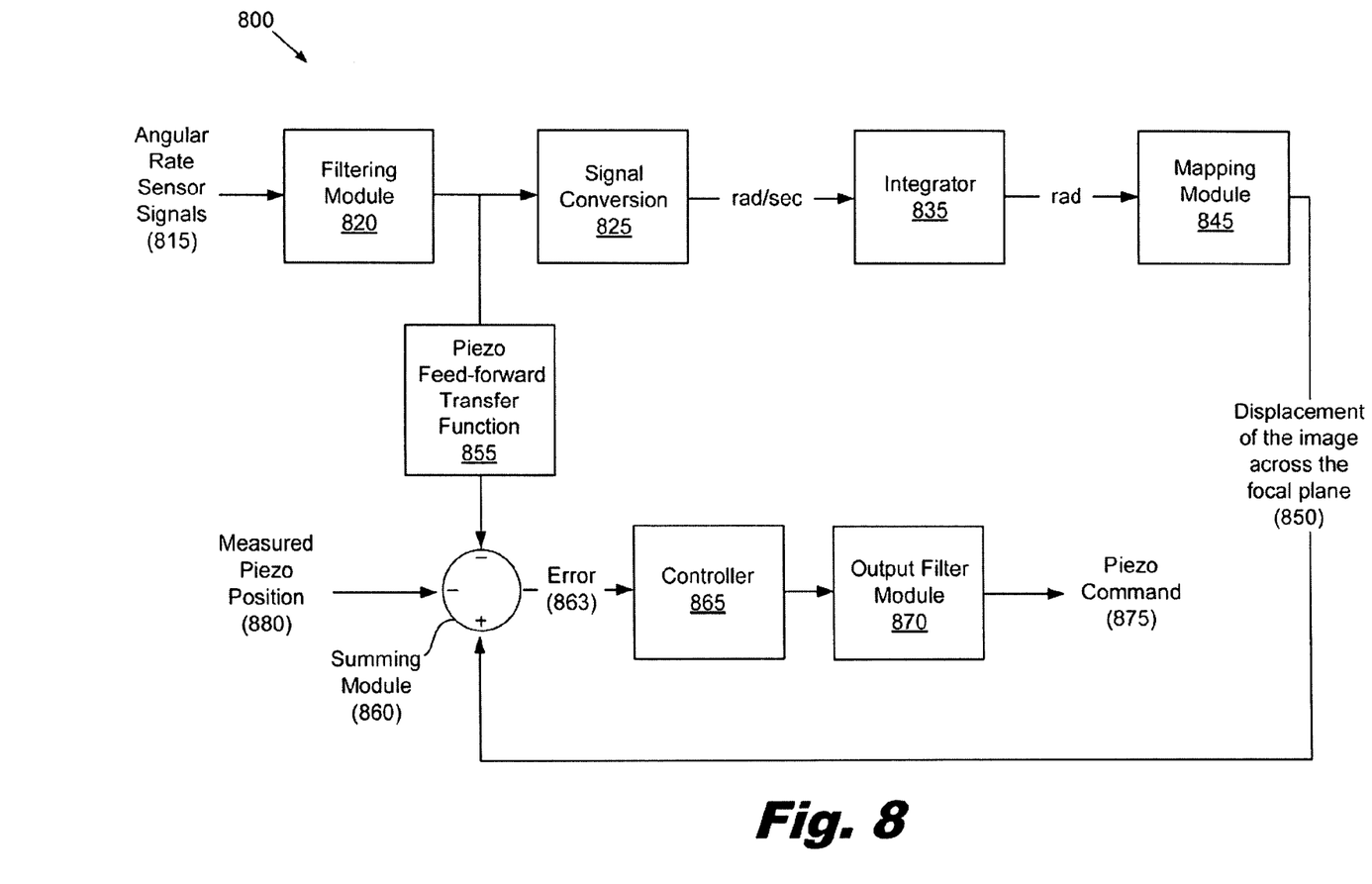
FIG. 8 is a flow chart showing an illustrative control system for a three axis piezo stabilized imaging system, according to one embodiment of principles described herein.

FIG. 8 is a flow chart showing an illustrative control system (800) for a three axes piezo stabilized imaging system. According to one illustrative embodiment, angular rate sensor signals (815) enter the system from the angular sensors (625, FIG. 6). These signals (815) are received by a filtering module (820) which pre-filters the sensor signals (815). According to one illustrative embodiment, the filtering module (820) may include a high pass filter which shapes the response in the operating frequency band of the image stabilization system. The filtered signals are then passed to a signal conversion module (825). The signal conversion module (825) converts the filtered signals into an angular rate by applying sensor specific calibrations. For example, each sensor may have an angular sensitivity which can be expressed in terms of radians per second per volt. The signal conversion module (825) converts the signal voltage by applying the angular sensitivity to produce angular rate data expressed in terms of radians per second. This output data is received by an integrator (835) which integrates the angular rate data with respect to time to generate an instantaneous rotation in radians. This rotation is mapped into optical space by the mapping module (845). According to one illustrative embodiment, the mapping module (845) converts the rotation in radians into displacement of the image across the focal plane. For example, the mapping module (845) may use geometric and optical properties of the system to convert the rotation of the optical bench into displacement of the image across the focal plane.

This displacement (850) is passed into a summing module (860) where it is combined with the measured piezo position (880) and the output of a piezo transfer function (855). The measured piezo position (880) represents the current position of the piezo stage, and consequently, the current position of the focal plane. The piezo feed-forward transfer function (855) is a model of the piezo stage behavior which provides information about the frequency domain response of the piezo stage.

If the combination of the three inputs to the summing module (860) results a zero, the focal plane is already in the desired position and no response is necessary. If the result of the summing function is non-zero, the focal plane needs to be moved to a new location to compensate for jitter-induced motion of the image across the focal plane. This is output as an error (863). This error (863) is received by a controller (865) which controls the motion of the piezo stages. According to one illustrative embodiment, the controller (865) may be a proportional-integral-derivative (PID) controller. The PID controller uses a control loop to correct for the error (863) by outputting control signals to the piezo stages and using capacitive or inductive sensors within the piezo stages to determine if the desired motion was produced.

According to one illustrative embodiment, the output of the controller (865) may be filtered by an output filter module (870). The output filter module (870) may include a number of functions, such as notch filters which prevent the excitation of undesirable structural modes and a low pass filter which imposes a cut-off frequency on the controller. The notch filters allow the controller to continue to control the piezo stages at frequencies higher than one or more structural modes. The low pass filter limits the control signals to a desired frequency range and reduces undesirable high frequency noise. A piezo command (875) is generated by the output filter module (870) and passed to the piezo stage. The control system (800) described above can be replicated for each control axis within the image stabilization system and can correct for jitter frequencies below one hertz up to hundreds of hertz.

Figure 9:
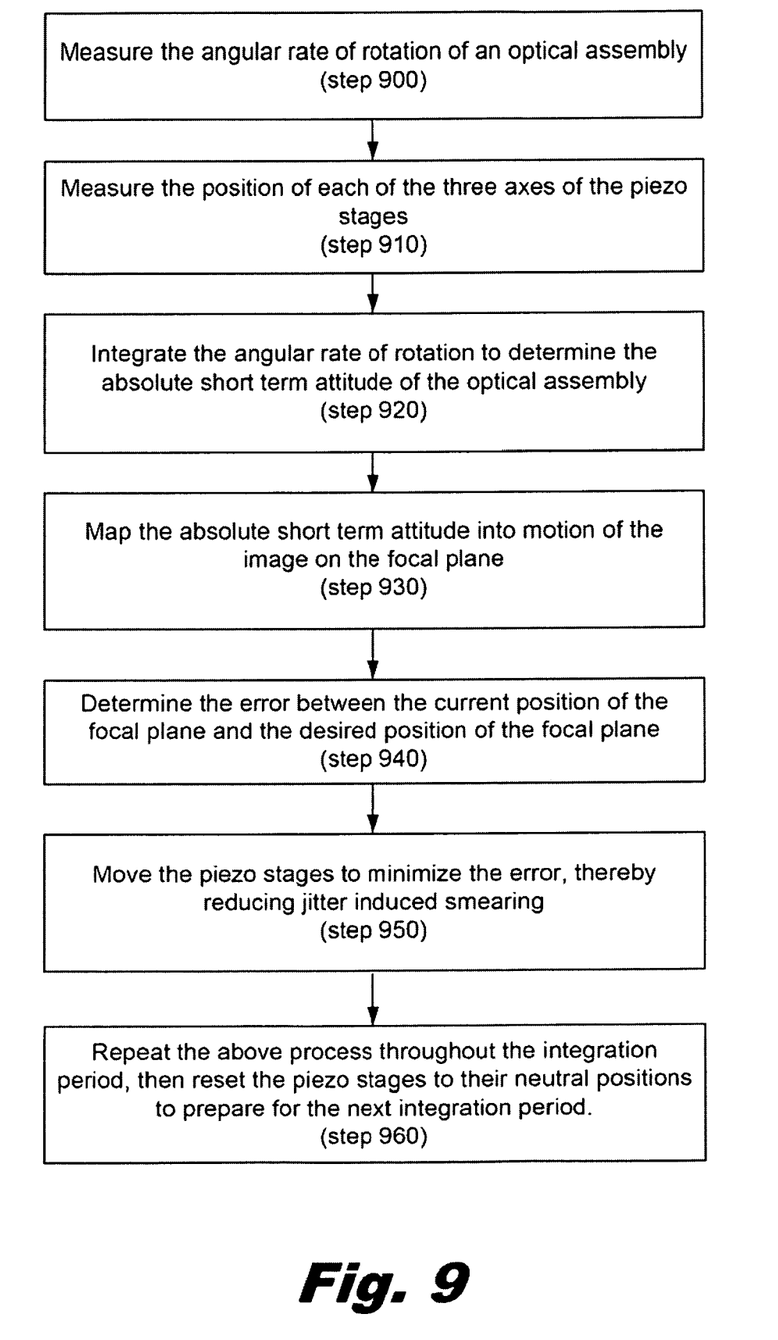
FIG. 9 is a flow chart of an illustrative method for stabilizing an image system using a three-axis piezoelectric-stabilized, optical system, according to one embodiment of principles described herein.

FIG. 9 is a flow chart of an illustrative method for stabilizing an image system using a three-axes piezoelectric-stabilized, optical system. In a first step, an angular rate of rotation of the optical assembly is measured (step 900). As described above, this measurement may be made using a number of methods, including magnetohydrodynamic gryoscopes. The current position of each of the three controllable axes of the piezo stages are then measured (step 910). According to one illustrative embodiment, the X and Y axes measurements are produced by inductive sensors and the rotational measurement is produced by a strain gage. The angular rates are then integrated to determine the absolute short term attitude of the optical assembly (step 920). The absolute attitude is then mapped into motion of the image on the focal plane (step 930). The current position of the three controllable axes is then compared to the desired position of the focal plane (step 940). If the current position of the three controllable axes is substantially equal to the desired position, no action is taken. However, when an error is detected, the appropriate piezo stages are actuated to minimize the error, thereby reducing jitter-induced smear (step 950). This process is repeated throughout the integration period. After the integration period ends, the current frame is read out of the focal plane array and the piezo stages are reset to their neutral positions to prepare for the next integration period (step 960).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system comprising:
    an optical assembly configured to receive electromagnetic radiation emitted by a target and produce an image of said target;
    a focal plane array, said focal plane array being configured to receive said image and integrate at least a portion of said electromagnetic radiation making up said image to produce an electrical representation of said image;
    sensors configured to provide kinematic data;
    a control system receiving said kinematic data and estimating jitter-induced motion of said image on said focal plane and outputting a control signal; and
    piezo-electric actuators configured to receive said control signal and to translate said focal plane along two orthogonal axes and rotate said focal plane about a third orthogonal axis such that jitter-induced motion of said image on said focal plane is reduced, wherein said piezo-electric actuators comprise an X-Y stage comprising a single monolithic piece of metal which has been machined to form flexural joints which are moved by peizo-electric material.

2. The system of claim 1, wherein said third orthogonal axis is substantially parallel to a bore axis of said optical assembly.

3. The system of claim 1, wherein said third orthogonal axis is substantially collinear with a bore axis of said optical assembly.

4. The system of claim 1, wherein said system is configured to reduce jitter-induced motion of said image on said focal plane in a range which includes frequencies above 25 Hz to 500 Hz.

5. The system of claim 1, wherein said piezo-electric actuators further comprise a rotation stage, the X-Y stage producing translations on the order of 100 microns and the rotation stage producing rotations on the order of 10 milliradians.

6. The system of claim 5, wherein said focal plane is directly attached to said rotation stage, said rotation stage being attached to said X-Y stage such that actuation of said X-Y stage moves both said rotation stage and said focal plane.

7. The system of claim 6, in which natural modes of said X-Y stage, when supporting said rotation stage and said focal plane, are greater than 300 Hz.

8. The system of claim 6, in which natural modes of said rotation stage, when supporting said focal plane, are greater than 300 Hz.

9. The system of claim 1, further comprising a multi-axis gimbal, said multi-axis gimbal providing pointing capabilities to said system.

10. The system of claim 1, wherein said sensors measure angular displacement.

11. The system of claim 1, wherein said sensors are angular rate sensors, said angular rate sensors being configured to provide angular rates of motion about three orthogonal axes.

12. The system of claim 1, wherein said control system comprises notch filters, said notch filters reducing excitation of resonant frequencies within said system; the control system further comprising a feed-forward transfer function which provides frequency domain response information of said actuator.

13. The system of claim 1, wherein said control system is configured to receive data from said integral non-contact sensors and calculate a measured piezo position; said control system summing said measured piezo position with said jitter-induced motion of said image on said focal plane to find a positional error of said focal plane.

14. The system of claim 1, in which said piezo-electric actuators comprise a monolithic flexure and at least one strain gage position sensor attached to said monolithic flexure.

15. A system for reducing jitter-induced smear on an infrared focal plane comprising:
    an infrared focal plane array configured to receive electromagnetic radiation and integrate at least a portion of said electromagnetic radiation to produce an electrical representation of an image;
    a gimbaled optical assembly configured to receive electromagnetic radiation emitted by a target and focus said image of said target on said infrared focal plane array;
    gyroscopic sensors configured to provide angular rate data in three orthogonal axes;
    a control system receiving said angular rate data and estimating jitter-induced motion of said image on said focal plane and outputting a control signal, said control system comprising notch filters, said notch filters reducing excitation of structural resonant frequencies within said system;

piezo-electric actuators configured to receive said control signal and to translate said infrared focal plane along two orthogonal axes and rotate said infrared focal plane about a bore axis such that jitter-induced motion of said image on said infrared focal plane is reduced; and a visible camera, said visible camera having a higher frame rate than said infrared focal plane array, in which changes between image frames produced by said visible camera are analyzed to sense angular rotations of the system to supplement angular rate data produced by said gyroscopic sensors.

16. The system of claim 15, in which the system comprises five controlled degrees of freedom: two coarse rotational degrees of freedom provided by a two axis gimbal and three finer degrees of freedom actuated by said piezo-electric actuators.

17. A method for reducing jitter-induced smear in an imaging system comprising:

sensing jitter of said imaging system;

calculating jitter-induced motion of electromagnetic energy on a focal plane; and rotating said focal plane about a bore sight axis of said imaging system using a piezo-electric stabilization system to reduce said jitter-induced smear within said imaging system wherein said piezo-electric stabilization system comprises piezo-electric actuators comprising an X-Y stage comprising a single monolithic piece of metal which has been machined to form flexural joints which are moved by piezo-electric material.

18. The method of claim 17, wherein:

the sensing comprises measuring angular rates of rotation of said imaging system in three orthogonal axes; and the calculating comprises:

integrating said angular rates of rotation to determine a short term attitude of said imaging system;

mapping said short term attitude of said imaging system to determine said jitter-induced motion; and calculating a demanded position of said focal plane to reduce said jitter-induced motion of said electromagnetic energy on said focal plane.

\* \* \* \* \*